US012766809B2

(12) United States Patent
Nandi et al.

(10) Patent No.: US 12,766,809 B2
(45) Date of Patent: Oct. 20, 2026

(54) FOAM INSULATION WITH IMPROVED LOW TEMPERATURE PROPERTIES USING POLYOL ADDITIVES

(71) Applicant: JOHNS MANVILLE, Denver, CO (US)

(72) Inventors: Malay Nandi, Littleton, CO (US); Lance Wang, Parker, CO (US); Jawed Asrar, Englewood, CO (US)

(73) Assignee: Johns Manville, Denver, CO (US)

(*) Notice: Subject to any disclaimer, the term of this patent is extended or adjusted under 35 U.S.C. 154(b) by 265 days.

(21) Appl. No.: 18/423,714

(22) Filed: Jan. 26, 2024

(65) Prior Publication Data

US 2025/0242566 A1 Jul. 31, 2025

(51) Int. Cl.

| | |
|---|---|
| ***B32B 5/18*** | (2006.01) |
| ***B32B 5/02*** | (2006.01) |
| ***B32B 5/24*** | (2006.01) |
| ***E04B 1/80*** | (2006.01) |

(52) U.S. Cl.

CPC .................. *B32B 5/18* (2013.01); *B32B 5/02* (2013.01); *B32B 5/245* (2013.01); *E04B 1/80* (2013.01); *B32B 2250/02* (2013.01); *B32B 2262/101* (2013.01); *B32B 2307/304* (2013.01); *B32B 2307/3065* (2013.01); *B32B 2607/00* (2013.01)

(58) Field of Classification Search

CPC .. B32B 5/18; B32B 5/02; B32B 5/245; B32B 2250/02; B32B 2262/101; B32B 2307/304; B32B 2307/3065; B32B 2607/00; B32B 2266/0278; B32B 2419/06; B32B 5/022; B32B 29/007; E04B 1/80

See application file for complete search history.

(56) References Cited

U.S. PATENT DOCUMENTS

| | | | | |
|---|---|---|---|---|
| 5,317,034 | A | 5/1994 | Nakamura et al. | |
| 5,391,317 | A | 2/1995 | Smits | |
| 6,086,788 | A | 7/2000 | Bogdan et al. | |
| 6,121,338 | A | 9/2000 | Colman | |
| 6,359,022 | B1 | 3/2002 | Hickey et al. | |
| 10,525,663 | B2 | 1/2020 | Nandi et al. | |
| 10,913,235 | B2 | 2/2021 | Nandi et al. | |
| 11,299,882 | B2 | 4/2022 | Nandi et al. | |
| 2004/0087674 | A1 | 5/2004 | Letts | |
| 2006/0052467 | A1 | 3/2006 | Pignagnoli et al. | |
| 2014/0162006 | A1 | 6/2014 | Albers et al. | |
| 2014/0220333 | A1 | 8/2014 | Bogdan et al. | |
| 2015/0118476 | A1 | 4/2015 | Bertucelli et al. | |
| 2015/0322194 | A1 | 11/2015 | Schmidt et al. | |
| 2015/0354211 | A1 | 12/2015 | Nandi et al. | |
| 2019/0092917 | A1* | 3/2019 | Nandi | C08G 18/4202 |
| 2022/0186491 | A1* | 6/2022 | Nandi | E04D 13/1643 |

* cited by examiner

*Primary Examiner* — Blaine Copenheaver
(74) *Attorney, Agent, or Firm* — Robert D. Touslee

(57) ABSTRACT

A polyisocyanurate foam insulation product is produced from an isocyanate component and a first component. The first component includes one or more polyester polyols, a fire retardant, and a multi-functional alcohol. The multi-functional alcohol is present in an amount of greater than 20 parts per 100 parts of polyester polyol The polyisocyanurate foam insulation product may have an R-value per inch of at least 6.5 when measured at 40° F. and may have an R-value per inch of at least 6.2 when measured at 25° F.

13 Claims, 6 Drawing Sheets

FOAM INSULATION WITH IMPROVED LOW TEMPERATURE PROPERTIES USING POLYOL ADDITIVES

BACKGROUND

Polyisocyanurate foam (i.e., PIR board stock) has been widely used to insulate roofs and walls of commercial and industrial buildings for many decades due to its excellent thermal insulation, flame resistance, and mechanical properties. The insulating performance and other performance of polyisocyanurate foams vary based on temperature. For example, FIG. 1 illustrates the insulation performance of a prior polyisocyanurate foam board as a function of temperature. As is apparent, the insulating value of the board peaks at about 65° F., and drops significantly at colder temperatures, and also drops somewhat at higher temperatures.

While polyisocyanurate foams may provide excellent insulation as compared with some other materials, better performance is often desired at lower temperatures.

BRIEF SUMMARY

Embodiments of the present technology may improve the performance of thermal insulation at low temperatures.

The present technology is generally directed to polyisocyanurate foam insulation products. Products include a polyisocyanurate core having a first component, an isocyanate component, and a fire retardant. The first component includes a blowing agent, one or more polyester polyols, and at least one multi-functional alcohol. The at least one multi-functional alcohol is present in an amount of greater than 20 parts per 100 parts of the one or more polyester polyols. Products include where the fire retardant is present in an amount of less than or about 3.5 wt. %, based upon a weight of the polyisocyanurate core, and the polyisocyanurate foam insulation product exhibits a smoke development index (ASTM E84) of less than 450.

In embodiments, the polyisocyanurate core includes a ratio of NO groups to OH groups of less than 2.5:1. In further embodiments, the polyisocyanurate core exhibits a foam index of less than 260. Moreover, in embodiments, products include a facer coupled with a first surface of the polyisocyanurate core, where the facer includes fiberglass, felt, foil, or paper. Additionally or alternatively, in embodiments, the polyisocyanurate foam insulation product has an R-value per inch of at least 6.2 when measured at 25° F. In embodiments, the polyester polyol has a hydroxyl number between about 25 and 500. Embodiments include where the multi-functional alcohol includes triethanolamine (TEA), and where the triethanolamine is present in the polyisocyanurate core in an amount of about 1 wt. % to about 10 wt. %, based on the weight of the polyisocyanurate core.

The present technology is also generally directed to methods for forming a polyisocyanurate foam product. Methods include providing a first component, where the first component includes a blowing agent, one or more polyols, and at least one multi-functional alcohol, and the at least one multi-functional alcohol is present in an amount of greater than 20 parts per 100 parts of the one or more polyester polyols. Methods include introducing an isocyanate component to the first component to form a polyisocyanurate foam. Methods include adding a fire retardant to the polyisocyanurate foam and forming a polyisocyanurate core. Methods include where the polyisocyanurate foam includes an isocyanate index of less than 260 and the polyisocyanurate foam product has an R-value per inch of at least 6.5 when measured at 40° F.

In embodiments, the fire retardant is present in an amount of less than or about 3.5 wt. %, based upon a weight of the polyisocyanurate core. In more embodiments, the polyisocyanurate foam exhibits an isocyanate index of less than 250. Furthermore, in embodiments, the at least one multifunctional alcohol has a weight average molecular weight of about 80 g/mol to about 20,000 g/mol. Additionally or alternatively, in embodiments, the at least one multi-functional alcohol forms about 1 wt. % to about 10 wt. % of the polyisocyanurate core. In yet more embodiments, the first component further includes a halogenated or non-halogenated fire retardant, a catalyst, a surfactant, or a combination thereof. Embodiments include where the one or more polyols includes a polyester polyol, and wherein the polyester polyol component has a hydroxyl number between about 25 and 500.

The present technology is also generally directed to roofing and/or wall systems. Systems include a polyisocyanurate foam insulation product having a polyisocyanurate core, the polyisocyanurate core comprising a first component, an isocyanate component, and a fire retardant. Systems include where the first component includes a blowing agent, one or more polyester polyols, and at least one multifunctional alcohol, where the at least one multi-functional alcohol is present in an amount of greater than 20 parts per 100 parts of the one or more polyester polyols. Systems include where the fire retardant is present in an amount of less than or about 3.5 wt. %, based upon a weight of the polyisocyanurate core, and the polyisocyanurate foam insulation product exhibits a smoke development index (ASTM E84) of less than 450.

In embodiments, the polyisocyanurate foam insulation product includes a polyisocyanurate foam board. Furthermore, in embodiments the polyisocyanurate foam board comprises a wall board. In more embodiments, the polyisocyanurate foam board includes an insulation board, a cover board, or a combination thereof. Additionally or alternatively the polyisocyanurate foam insulation product has an R-value per inch of at least 6.2 when measured at 25° F. Embodiments include where the system includes a facer coupled with a first surface of the polyisocyanurate core, wherein the facer comprises fiberglass, felt, foil, or paper.

DETAILED DESCRIPTION OF THE INVENTION

Figure 1:
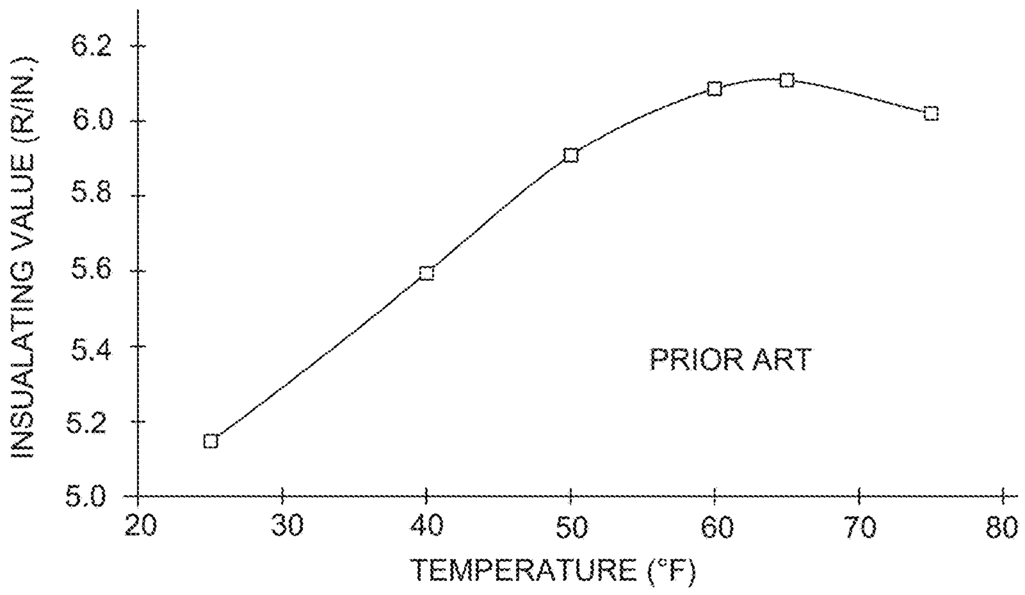
FIG. 1 illustrates the insulation performance of a prior polyisocyanurate foam board as a function of temperature.

Polyisocyanurate foams, also called "polyiso" foams may be made by combining separate liquid mixtures that include the polyisocyanates (the A-side mixture) and the polyols (the B-side mixture). The A-side mixture and B-side mixture can be combined to form the polyiso foam product. A blowing agent is used, typically in the B-side mixture, to cause the foaming of the formulation, creating a cellular structure having good insulating properties. A common blowing agent may include pentane.

Several different characteristics are desirable in polyiso boards used for building insulation or other applications. Of course, a high insulating value is desired, for reducing energy consumption and providing comfort in the building. In addition, the insulation boards should be strong enough to withstand handling and usage without significant damage, including during and construction. Furthermore, applications desire for insulation boards to be light weight, in order to minimize the cost of the raw materials used to make the boards. It is also desirable that the viscosity of the B-side mixture be low, to facilitate processing of the formulation during board manufacturing. However, in many formulations, such goals may be contradictory, and may therefore fail to provide one or more desirable features in order to exhibit another.

Moreover, existing polyiso boards exhibit decreasing insulating properties at low temperatures. Reduction in insulating value at low temperatures is an unusual characteristic, which may be unique to polyiso boards. One mechanism causing such a reduction phenomenon is believed to be condensation of residual blowing agent within the cells of the foam.

Methods have been explored for raising the low temperature performance of polyisocyanurate insulation, for example by changing the blowing agent used in making the insulation as described in U.S. Patent Application Publication No. 2018/0282998, the entire disclosure of which is hereby incorporated by reference herein for all purposes. A blowing agent or combination of blowing agents having a lower boiling point (i.e. a lower condensation temperature) may result in less condensation, and may permit the insulation to maintain better insulating properties at lower temperatures as compared with an insulation made with a higher-boiling-point blowing agent. However, other methods are still desired for improving the low-temperature performance of polyiso insulation, as such efforts increase the petroleum-based materials in the polyiso product, and also fail to adequately address the degradation in insulating properties at low temperatures.

The present technology has surprisingly found that by utilizing high levels of tailored multi-functional alcohols, a low foam index formulation is provided that forms a polyiso board with excellent rigidity and fire retardancy. Moreover, products according to the present technology are capable of achieving such improved properties even at reduced fire retardant loading. This is surprising, as a lower index should decrease the strength of the product, and reduce thermal stability and reduced fire retardant levels should decrease fire retardancy properties. Thus, products and methods according to the present technology may provide a polyiso product that exhibits excellent stability, fire retardancy, and strength properties.

While similar classes of reactants are used for polyisocyanurate (PIR) and polyurethane (PUR) foam formulations, the PIRs are formed under conditions that promote the trimerization of the polyisocyanate reactants into isocyanurate rings. The reaction scheme below shows the formation of an isocyanurate ring from the trimerization of three generic diisocyanate molecules:

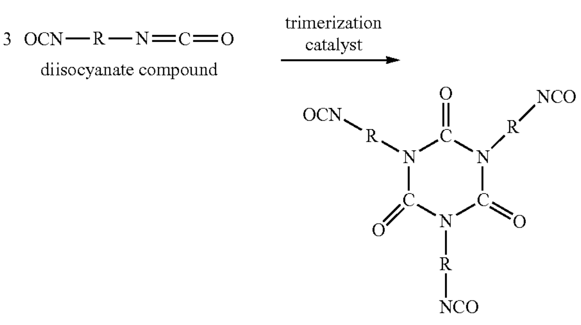

diisocyanate compound isocyanurate (trimer)

The polyisocyanate reactants (e.g., diisocyanate reactants) still leave active isocyanate groups on the isocyanurate ring after trimerization which can react with additional isocyanate reacting groups to form a crosslinked polyisocyanurate polymer. When the polyisocyanurate polymer is formed with the help of a blowing agent, it forms a PIR foam. The presence of the isocyanurate rings in the molecular structure of a PIR foam normally imparts greater stiffness and higher resistance to chemical and thermal breakdown compared with polyurethane foams. However, surprisingly, formulations according to the present technology exhibit a lower trimer content and/or foam index without sacrificing fire resistance or thermal stability.

For instance, in embodiments, a lower trimer content may be illustrated by a low PIR to PUR ratio. Thus, in embodiments, polyiso foams according to the present technology may exhibit a PIR/PUR ratio of less than or about 3, such as less than or about 2.9, such as less than or about 2.8, such as less than or about 2.7, such as less than or about 2.6, such as less than or about 2.5, such as less than or about 2.4, such as less than or about 2.3, such as less than or about 2.2, such as less than or about 2.1, such as less than or about 2, or any ranges or values therebetween.

Because a distinguishing characteristic of the PIR formation is the trimerization of the isocyanate reactant to form isocyanurate rings, PIR formulations generally have a larger molar portion of the polyisocyanate to polyol, and include polyisocyanate trimerization catalysts. In many instances, the polyols used in the formulations are also different.

The A-side mixture may include one or more polyisocyanate compounds. Example polyisocyanates may include substituted or unsubstituted polyisocyanates, and may more specifically include aromatic, aliphatic, and cycloaliphatic polyisocyanates having at least two isocyanate functional groups. Specific example aromatic polyisocyanates include 4,4'-diphenylmethane diisocyanate (MDI), polymeric MDI (PMDI), toluene disisocyanate, and allophanate modified isocyanate. A commercial example of a isocyanate formulation that may be used in the present formulations is Wannate® PM-700 manufactured by Wanhua Chemical Group Co., Ltd. of Yantai, China. This isocyanate formulation may have a viscosity of about 600 mPa-S at 25° C., a functionality of about 2.9, and an isocyanate content of about 30.4%.

In embodiments, the A-side mixture may account for greater than or about 50 wt. % of the polyiso foam, such as greater than or about 52. % wt. %, such as greater than or about 55 wt. %, such as greater than or about 57.5 wt. %, such as greater than or about 60 wt. %, such as greater than or about 62.5 wt. %, such as greater than or about 65 wt. %, such as greater than or about 66 wt. %, or such as less than or about 70 wt. %, such as less than or about 67.5 wt. %, or any ranges or values therebetween.

The B-side mixture of the polyiso foam, also referred to as the first component herein, may include one or more polyol compounds. The polyol compound typically includes either or both a polyether and polyester having a hydroxyl number between about 25 and 500, and more commonly between about 200 and 270. The hydroxyl number is a measure of the concentration of the hydroxyl group in the polyol, which is expressed as the milligrams of KOH (potassium hydroxide) equivalent to the hydroxyl groups in one gram of polyol. Polyether is commonly not used in conventional polyisocyanurate foam boards because it is typically less flame resistant than the aromatic polyester that is used in such boards. A lower hydroxyl number commonly results in longer polymer chains and/or less cross linking, which results in a relatively loose polymer chain. In contrast, a higher hydroxyl number commonly results in more cross linking and/or shorter polymer chains, which may provide enhanced mechanical properties and/or flame resistance.

Example polyols may include polyether polyols, polyester polyols, polycarbonate polyols, aromatic polyols (including polyester polyols, PET-based polyols, and polyamide-based polyols), and mannich polyols. Polyether polyols may be made by polymerizing one or more types of epoxides, such as ethylene oxide or propylene oxide. The may also be made by polymerizing the epoxide with a polyol such as a diol (e.g., glycol), triol (e.g., glycerin), or other polyol. Example polyether polyols may include polyether diols such as polyether polyethylene glycol, polypropylene glycol, and poly(tetramethylene ether) glycol, among other polyether diols.

Polyester polyols may be made by the stepwise polymerization of polyols and polycarboxylic acids. For example, polyester polyols may be formed by the reaction of a glycol such as diethylene glycol with a dicarboxylic acid such as phthalic acid to form an aromatic polyester polyol. Commercially available polyester polyols that may be used with the present formulations include those sold by Invista, including Terate® HT 5503 and Terate® HT 5349. Terate® HT 5503 may have a hydroxyl number between 224 and 245, and a functionality of about 2.0. Terate® HT 5349 may have a hydroxyl number between 295 and 315, and a functionality of about 2.45. The polyols used may be only polyester polyols and may exclude other polyols.

Polycarbonate polyols are a special class of polyester polyol, which can be produced through polycondensation of diols with phosgene or transesterification of diols, such as hexane diol, with carbonic acid ester. Polycarbonate polyols may be produced from propylene oxide and carbon dioxide blended with dibasic ester under catalytic condition. The carbon dioxide may account for approximately 40% of the polyol mass. The polyol may have a functionality of about 2.0 and may have hydroxyl number of about 72. Commercial available polycarbonate polyols include Converge® Polyol sold by Novomer, now Saudi Aramco. The polycarbonate polyol may be used as blend with polyester polyol such as Terate® HT 5503.

Nonetheless, in embodiments, the polyol component may be a polyester polyol, or a blend of polyester polyols, but may not include one or more non-polyester polyols. Regardless of the polyol or polyols utilized, the polyol component may be present in an amount of less than or about 25 wt. % based upon the weight of the polyiso foam, such as less than or about 22.5 wt. %, such as less than or about 20 wt. %, such as less than or about 18 wt. %, or such as greater than or about 5 wt. %, such as greater than or about 7.5 wt. %, such as greater than or about 10 wt. %, such as greater than or about 12.5 wt. %, such as greater than or about 15 wt. %, such as greater than or about 17.5 wt. %, or any ranges or values therebetween.

Catalysts used in polyisocyanurate foam formulations normally include trimerization catalysts that catalyze the formation of cyclic isocyanurate trimers from the polyisocyanate reactant. Example trimerization catalysts include tertiary amines, such as 1, 3, 5-tris(3-(dimethylamino) propyl)-hexahydro-triazine and quaternary ammonium salts, such DABCO-TMR and DABCO-TMR2 sold by AirProducts, now Evonik. Example catalysts may also include metal catalysts, such as potassium octoate and potassium acetate. Example catalysts that may be useful in embodiments of the invention include OMG 977™ and OMG 1123™ catalysts sold by Borchers OM Group, and TMR-20™ catalyst sold by Evonik. Quaternary ammonium salts, such as TMR™ or TMR2™, and metal catalysts, such as TMR-20™, are particularly effective in promoting trimer formation at high index.

In embodiments, the one or more catalysts may be present in an amount of about 1 part to about 15 parts per 100 parts of the one or more polyester polyols, such as greater than or about 2 parts, such as greater than or about 4 parts, such as greater than or about 6 parts, such as greater than or about 8 parts, such as greater than or about 10 parts, or such as less than or about 14 parts, such as less than or about 12 parts, or any ranges or values therebetween. Stated differently, in embodiments, the one or more catalysts may be present in an amount of about 0.1 wt. % to about 5 wt. % based upon the weight of the polyiso foam, such as greater than or about 0.2 wt. %, such as greater than or about 0.4 wt. %, such as greater than or about 0.6 wt. %, such as greater than or about 0.8 wt. %, such as greater than or about 1 wt. %, such as greater than or about 1.2 wt. %, such as greater than or about 1.4 wt. %, such as greater than or about 1.6 wt. %, such as greater than or about 1.8 wt. %, such as greater than or about 2 wt. %, such as greater than or about 2.5 wt. %, or such as less than or about 4 wt. %, such as less than or about 3.5 wt. %, such as less than or about 3 wt. %, such as less than or about 2.5 wt. %, such as less than or about 2.25 wt. %, such as less than or about 2 wt. %, such as less than or about 1.9 wt. %, or any ranges or values therebetween.

The present polyisocyanurate formulations may also include one or more surfactants. The surfactants function to improve compatibility of the formulation components and stabilize the cell structure during foaming. Example surfactants can include organic or silicone based materials, or non-silicone materials. Example surfactants that may be useful in embodiments of the invention include Niax Silicone L6900 (Momentive), Tegostab B84506 (Evonik Industries), Vorasurf™ sold by The Dow Chemical Company and DC 193 sold by Dow Corning Company.

In embodiments, the one or more surfactants may be present in an amount of about 0.1 part to about 5 parts per 100 parts of the one or more polyester polyols, such as greater than or about 0.2 parts, such as greater than or about 0.4 parts, such as greater than or about 0.6 parts, such as greater than or about 0.8 parts, such as greater than or about 1 part, or such as less than or about 1.4 parts, such as greater than or about 1.6 parts, such as greater than or about 1.8 parts, such as greater than or about 2 parts, or such as less than or about 4.5 parts, such as less than or about 4 parts, such as less than or about 3.5 parts, such as less than or about 3 parts, such as less than or about 2.5 parts, such as less than or about 2 parts, such as less than or about 1.75 parts, or any ranges or values therebetween. Stated differently, in embodiments, the one or more surfactants may be present in an amount of about 0.01 wt. % to about 1 wt. % based upon the weight of the polyiso foam, such as greater than or about 0.02 wt. %, such as greater than or about 0.04 wt. %, such as greater than or about 0.06 wt. %, such as greater than or about 0.08 wt. %, such as greater than or about 0.1 wt. %, such as greater than or about 0.12 wt. %, such as greater than or about 0.14 wt. %, such as greater than or about 0.16 wt. %, such as greater than or about 0.18 wt. %, such as greater than or about 0.2 wt. %, such as greater than or about 0.22 wt. %, such as greater than or about 0.24 wt. %, such as greater than or about 0.26 wt. %, such as greater than or about 0.28 wt. %, or such as less than or about 0.9 wt. %, such as less than or about 0.8 wt. %, such as less than or about 0.7 wt. %, such as less than or about 0.6 wt. %, such as less than or about 0.5 wt. %, such as less than or about 0.4 wt. %, such as less than or about 0.3 wt. %, or any ranges or values therebetween.

The present polyisocyanurate formulations may also include the non-halogenated and/or halogenated fire retardants. In some embodiments, the polyisocyanurate formulation may include a halogenated fire retardant such as tris(2-chloroisopropyl) phosphate (TCPP). In some embodiments, a non-halogenated fire retardant may include a non-halogenated fire retardant such as diethyl hydroxylmethyl phosphonate (DEHMP). The non-halogenated fire retardant may reduce the amount of halogenated fire retardants such as TCPP use in the foams. The polyisocyanurate core may be able to form a sufficiently stable char when exposed to flame conditions in accordance with ASTM E-84. The stable char enables the polyisocyanurate core to pass the ASTM E-84 test. The polyisocyanurate foam insulation boards may exhibit an ASTM E1354-11b performance that is equivalent with or better than a similar polyisocyanurate foam insulation board having a traditional halogenated or non-halogenated fire retardant that does not have a foam index discussed herein.

The phosphorus containing non-halogenated fire retardant may include: an organo-phosphate, an organo-phosphite, and/or an organo-phosphonate. The non-halogenated organo phosphorus fire retardant could be non-reactive or reactive, i.e. containing isocyanate reactive functionality. An example non-reactive organa phosphorus fire retardant is a butyl diphenyl phosphate, dibutyl phenyl phosphate, and triphenyl phosphate, as well as combinations thereof. Example reactive organa phosphorus fire retardants include diethyl hydroxylmethyl phosphonate (DEHMP) and diethyl N,N-bis(2-hydroxyethyl) aminomethylphosphonate (DEHAMP, also known as Fyrol 6) sold by ICL and Lanxess. In other embodiments, the phosphorous containing non-halogenated fire retardant may include: dialkyl hydroxyalkanephosphonate (e.g., dimethyl hydroxymethylphosphonate), diaryl hydroxyalkanephosphonate (e.g., diphenyl hydroxymethylphosphonate), and the like.

Regardless of the fire retardant or retardants selected, the one or more fire retardants may be present in an amount of about 1 part to about 25 parts per 100 parts of the one or more polyester polyols, such as greater than or about 2.5 parts, such as greater than or about 5 parts, such as greater than or about 6 parts, such as greater than or about 8 parts, such as greater than or about 10 parts, such as greater than or about 12 parts, such as greater than or about 14 parts, such as greater than or about 15 parts, or such as less than or about 22.5 parts, such as less than or about 20 parts, such as less than or about 17.5 parts or any ranges or values therebetween. Stated differently, in embodiments, the one or more fire retardants may be present in an amount of about 0.1 wt. % to about 5 wt. % based upon the weight of the polyiso foam, such as greater than or about 0.2 wt. %, such as greater than or about 0.4 wt. %, such as greater than or about 0.6 wt. %, such as greater than or about 0.8 wt. %, such as greater than or about 1 wt. %, such as greater than or about 1.2 wt. %, such as greater than or about 1.4 wt. %, such as greater than or about 1.6 wt. %, such as greater than or about 1.8 wt. %, such as greater than or about 2 wt. %, such as greater than or about 2.5 wt. %, such as greater than or about 2.7 wt. %, or such as less than or about 4.5 wt. %, such as less than or about 4 wt. %, such as less than or about 3.5 wt. %, such as less than or about 3 wt. %, such as less than or about 2.75 wt. %, such as less than or about 2.5 wt. %, or any ranges or values therebetween. Surprisingly, the polyiso foams according to the present technology provide insulation with excellent fire retardancy and strength even at low fire retardant concentrations.

Embodiments of the present polyisocyanurate formulations may further include one or more of initiators and carbohydrates. Unlike catalysts, an initiator is consumed during the polymerization reaction and becomes part of the polyiso foam product. Example initiators may include aliphatic and aromatic polyamines, such as ethylene diamine, toluene diamines such as a combination of 3,5-diethyltoluene-2,4-diamine and 3,5-diethyltoluene-2,6-diamine sold under the tradename Ethacure® 100 by Albemarle Corp, and polyetheramines such as Jeffamine® T-403 and D-230 sold by Huntsman Corporation, among others. A carbohydrate may include a monosaccharide, an oligosaccharide, and/or a polysaccharide. Specific examples include sucrose and/or high-fructose corn syrup (HFCS), among other carbohydrates. While the carbohydrates include a plurality of hydroxyl groups, they are not believed to react with the polyisocyanates to as great an extent as the urethane polyols, and in some formulations they may not react at all.

The blowing agents used to make the foam may include hydrocarbon gas (e.g., n-pentane, isopentane, cyclo-pentane, etc.) and/or fluorocarbon gas, among others. The blowing agent may include a mixture of isopentane and n-pentane. Specific examples of fluorocarbon gases may include HFC-245fa (i.e., 1,1,1,3,3-pentafluoropropane) commercially available under the tradename Enovate® from Honeywell Corp., HFC-365mfc (i.e., $CF_3CH_2CF_2CH_3$), HFC-134a (i.e., 1,1,1,2-tetrafluoroethane), HCFO 1233zd (i.e., trans-1-chloro-3,3,3-trifluoropropene) sold under tradname Solstice® LBA by Honeywell Corp., Forane® 1233zd by Arkema, and HFO-1336mzz (1,1,1,4,4,4-hexafluoro-2-butene) sold under trade name Opteon 1100 by Chemours. The blowing agent may be in the B-side mixture. In some embodiments, the blowing agent is a 50/50 mixture of n-pentane and isopentane.

In embodiments, the blowing agent may be present in an amount of about 15 parts to about 45 parts per 100 parts of the one or more polyester polyols, such as greater than or about 17.5 parts, such as greater than or about 20 parts, such as greater than or about 22.5 parts, such as greater than or about 25 parts, such as greater than or about 27.5 parts, or such as less than or about 42.5 parts, such as less than or about 40 parts, such as less than or about 37.5 parts, such as less than or about 35 parts, such as less than or about 32.5 parts, or any ranges or values therebetween. Stated differently, in embodiments, the one or more blowing agents may be present in an amount of about 1 wt. % to about 10 wt. % based upon the weight of the polyiso foam, such as greater than or about 1.5 wt. %, such as greater than or about 2 wt. %, such as greater than or about 2.5 wt. %, such as greater than or about 3 wt. %, such as greater than or about 3.5 wt. %, such as greater than or about 4 wt. %, such as greater than or about 4.5 wt. %, such as greater than or about 5 wt. %, such as greater than or about 5.25 wt. %, such as greater than or about 5.5 wt. %, or such as less than or about 9 wt. %, such as less than or about 8.5 wt. %, such as less than or about 8 wt. %, such as less than or about 7.5 wt. %, such as less than or about 7 wt. %, such as less than or about 6.5 wt. %, such as less than or about 6 wt. %, or any ranges or values therebetween.

In embodiments, water may react with isocyanate in the mixture to generate carbon dioxide, which acts as a blowing agent.

Embodiments of the present technology also include one or more multi-functional alcohols. In embodiments, the one or more multi-functional alcohols has a molecular weight of from about 80 g/mol to about 20,000 g/mol, such as less than or about 15,000 g/mol, such as less than or about 12,500 g/mol, such as less than or about 10,000 g/mol, such as less than or about 9,000 g/mol, such as less than or about 8,000 g/mol, such as less than or about 7,000 g/mol, such as less than or about 6,000 g/mol, such as less than or about 5,000 g/mol, such as less than or about 4,000 g/mol, such as less than or about 3,000 g/mol, such as less than or about 2,000 g/mol, such as less than or about 1,000 g/mol, such as less than or about 500 g/mol, or such as greater than or about 100 g/mol, such as greater than or about 250 g/mol, such as greater than or about 500 g/mol, such as greater than or about 750 g/mol, such as greater than or about 1,000 g/mol, or any ranges or values therebetween.

In addition, the one or more multi-functional alcohols may have a functionality of greater than 2 active hydrogen per molecule, such as greater than 3, such as greater than 4, such as greater than 5, such as greater than 6, such as greater than 7, such as up to about 8, or such as less than 8, such as less than 7, such as less than 6, or any ranges or values therebetween.

In embodiments, the one or more multi-functional alcohols include aliphatic, cycloaliphatic, aromatic, heterocyclic polyhydric alcohols, a triglyceride based natural oil polyol, a functionalized natural oil such as castor oil or hydroxylated epoxidized natural oil, as well as combinations thereof. For instance, in embodiments, the one or more multi-functional alcohols may be or include triethanolamine (TEA), glycerol, trimethylol ethane, tri-methylol propane, pentaerythritol, di-pentaerythritol, tripentaerythritol, methyl glucoside, alkoxylated glycerol, alkoxylated pentaerythritol, alkoxylated methyl glucoside, alkoxylated sucrose, alkoxylated sorbitol, alkoxylated trimethylol ethane, alkoxylated trimethylol propane, amine polyol (such as Jeffol A-630, A-800 from Huntsman and Quadrol from BASF), Mannich polyol (such as Jeffol R-470X), or combinations thereof.

Regardless of the one or more multi-functional alcohols selected, the present technology has surprisingly found that the polyiso foam may exhibit the excellent properties when greater than 20 parts of the one or more multi-functional alcohols are utilized per 100 parts of the polyester polyol, such as greater than or about 22.5 parts, such as greater than or about 25 parts, such as greater than or about 27.5 parts, such as greater than or about 30 parts, as greater than or about 32.5 parts, such as greater than or about 35 parts, such as greater than or about 37.5 parts, such as greater than or about 40 parts, such as greater than or about 42.5 parts, such as greater than or about 45 parts, such as greater than or about 47.5 parts, as greater than or about 50 parts, such as greater than or about 52.5 parts, such as greater than or about 55 parts, such as greater than or about 57.5 parts, such as greater than or about 60 parts, or such as less than or about 80 parts, such as less than or about 70 parts, such as less than or about 60 parts, such as greater than or about 62.5 parts, such as greater than or about 65 parts, such as less than or about 55 parts, such as less than or about 50 parts, such as less than or about 45 parts, such as less than or about 42.5 parts, or any ranges or values therebetween. Nonetheless in embodiments, it may be desirable to utilize amounts greater than 20 parts, such as greater than or about 22.5 parts, but less than or about 40 parts, in order to obtain the excellent stability and fire retardancy properties while also maintaining good processability.

Stated differently, in embodiments, the one or more multi-functional alcohols may be present in an amount of about 1 wt. % to about 10 wt. % based upon the weight of the polyiso foam (and therefore the polyiso core), such as greater than or about 1.5 wt. %, such as greater than or about 2 wt. %, such as greater than or about 2.5 wt. %, such as greater than or about 3 wt. %, such as greater than or about 3.5 wt. %, such as greater than or about 4 wt. %, such as greater than or about 4.5 wt. %, such as greater than or about 5 wt. %, such as greater than or about 5.25 wt. %, such as greater than or about 5.5 wt. %, or such as less than or about 9 wt. %, such as less than or about 8.5 wt. %, such as less than or about 8 wt. %, such as less than or about 7.5 wt. %, such as less than or about 7 wt. %, such as less than or about 6.5 wt. %, such as less than or about 6 wt. %, such as less than or about 5.5 wt. % or any ranges or values therebetween.

The B-side mixture may also include an emulsifier.

An example formulation for a polyiso foam insulation may have an isocyanate index less than 260, such as less than or about 250, such as less than or about 240, such as less than or about 230, as compared to commercial polyiso foams which exhibit a foam index of greater than 260, such as generally greater than 270. When a polyisocyanate reacts with a polyol to form a urethane bond, one NCO group reacts with one OH group. As is known in the art, the index is defined as the ratio of NCO group to OH group as shown in the formula below:

$$\text{Index} = \frac{\text{Moles of NCO group}}{\text{Moles of OH group}} \times 100$$

When the number of NCO groups equals the number of OH groups in a formulation, a stoichiometric NCO:OH ratio of 1.0 is realized and a polyurethane polymer/foam is produced. When the number of NCO groups is significantly more than the number of OH groups in a formulation, the excess isocyanate group reacts with itself under catalytic condition to form isocyanurate linkage and polyisocyanurate foam is produced. Surprisingly, unlike prior guidance an index of less than 250, such as even less than or about 240, which provides a ratio of less than 2.5:1 NCO groups to OH groups, has been found to provide an excellent structural integrity, thermal strength and/or stability, and fire resistance, even at lower foam indexes as discussed herein.

A polyiso formulation according to the present technology may also have a metallo-organic compound as part of its B-side mixture. For example a compound of zinc or bismuth with various coordinating organic ligands may be used, and may impart favorable properties to the resulting foam. An example of an additive including a zinc compound and usable in embodiments of the invention is KKAT®XK-614 Zinc complex available from King Industries, Inc. USA. An example of a bismuth additive usable in embodiments of the invention is KKAT®—XC-C227 Bismuth complex, 2-ethylhexanoic acid (CAS 149-57-5) also sold by King Industries, Inc. USA. In some embodiments, the metallo-organic compound may include carbon, and may be for example a zinc salt such as a zinc carboxylate. In some embodiments, the metallo-organic compound may be about 0.1 to 1.0 weight percent of the B-side mixture.

Figure 2:
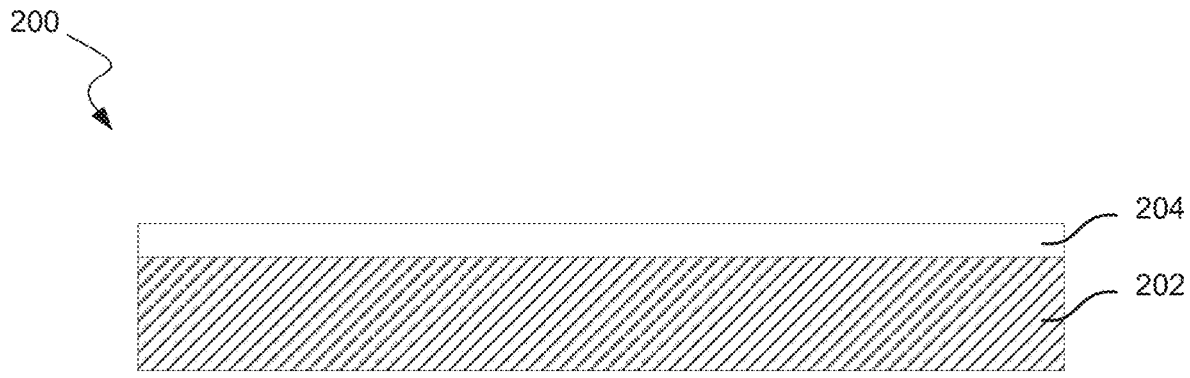
FIG. 2 illustrates an embodiment of a polyisocyanurate foam board.

Referring now to FIG. 2, illustrated is an embodiment of a polyisocyanurate foam board 200 (hereinafter foam board 200). The foam board 200 includes a polyisocyanurate core 202 that is produced from an isocyanate, a polyol, and a blowing agent in accordance with embodiments of the invention. The polyisocyanurate core 202 typically has an average foam cell size of less than about 200 microns, and more commonly between about 100-150. In contrast, conventional foam boards typically have an average foam cell size of between about 200 and 300. The smaller foam cell size of the polyisocyanurate core 202 may allow the core to exhibit an increased R-value when compared with conventional cores. In some embodiments, a polyisocyanurate foam preferably has a cell size of less than 120 microns.

R-values herein are measured according to ASTM standard test method C518, surface burning characteristics are measured according to ASTM standard test method E84 and E1354, as will be discussed in greater detail below.

The foam insulation board may have different core densities. For example, a lower density foam insulation board may have a core density of between about 1.5 and 5 $lbs/ft^3$, including between about 1.6 and 4 $lbs/ft^3$, such as between about 1.8 and 3 $lbs/ft^3$, or any ranges or values therebetween. A higher density foam cover board may have a foam core density of up to 12 $lbs/ft^3$, including between about 5 and 10 $lbs/ft^3$. For insulation purposes, a foam insulation board in accordance with embodiments of the invention preferably has a core density of less than 2.0 $lbs/ft^3$, and more preferably less than 1.7 $lbs/ft^3$, and even more preferably less than 1.61 $lbs/ft^3$.

Foam board 200 also includes an optional facer material 204 that is applied to at least one surface of the polyisocyanurate core 202. The facer material 204 typically includes a glass fiber mat, but may include other types of facer materials. The facer material 204 is typically selected based on the type of polyisocyanurate foam board produced. For example, facers for polyisocyanurate foam insulation boards that are used in roofing applications may include: a reinforced cellulosic felt facer, an un-coated polymer bonded glass fiber mat, a coated polymer bonded glass fiber mat, and the like. In such embodiments, the facer 204 may include a mineral and/or pigment based coating with high solid content to provide one or more desired characteristics, such as low porosity, fire retardancy, mechanical strength, and the like. The facer 204 may have a thickness of between about 0.3 and 1.2 mm.

Facers for polyisocyanurate foam cover boards that are used in roofing applications may include: coated polymer bonded glass fiber mat, which provides desired characteristics, such as low porosity, fire retardancy, mechanical strength, and the like. In such embodiments, the facer 204 may have a thickness of between about 0.4 and 1.2 mm, such as about 0 . . . . Facers for polyisocyanurate foam boards that are used in wall applications may include a metal foil facer that is configured to reflect heat, such as from and/or into a structure, and/or may include an un-coated polymer bonded glass mat, coated polymer bonded glass mat, and the like. In such embodiments, the facer 204 may have a thickness of between about 0.006 and 1.2 mm. The thickness of 0.006 mm typically represents the thickness of a metal facer while the 1.2 mm represents the thickness of other facers.

Although FIG. 2 shows the facer 204 being positioned on a single side of the polyisocyanurate core 202, it should be realized that in many embodiments an additional facer may be positioned on the opposite side of the polyisocyanurate core 202. The additional facer may be a similar or different facer than facer 204 and/or may have a different thickness and/or material coating as desired.

The polyisocyanurate foam board 200 commonly has a core density of between about 1.45 and 25 $lbs/ft^3$, and more commonly between 1.5 and 7.5 $lbs/ft^3$. In an example embodiment, a polyisocyanurate foam cover board may have a core density of between about 4 and 8 $lbs/ft^3$, and more commonly between about 6 and 7 $lbs/ft^3$; a polyisocyanurate foam insulation roofing board may have a core density of between about 1.5 and 2.0 $lbs/ft^3$, and more commonly between about 1.6 and 1.7 $lbs/ft^3$; and a polyisocyanurate foam sheathing board may have a core density of between about 1.5 and 2.5 $lbs/ft^3$, and more commonly between about 1.6 and 2.0 $lbs/ft^3$.

Figure 3:
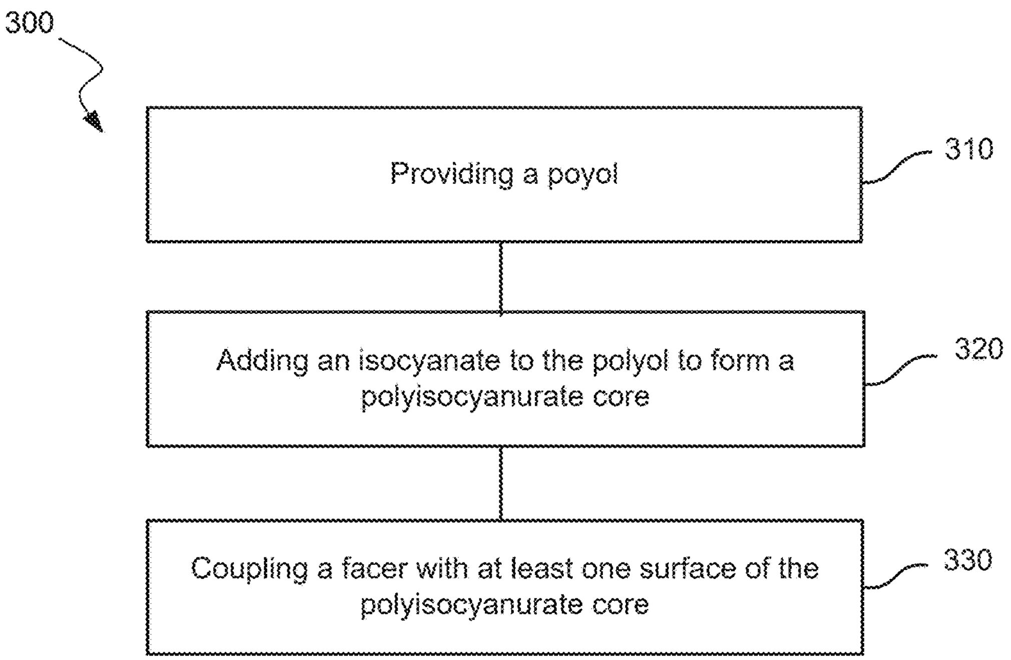
FIG. 3 illustrates is a method of forming a polyisocyanurate foam board, in accordance with embodiments of the invention.

Referring now to FIG. 3, illustrated is a method of forming a polyisocyanurate foam board. At block 310, a polyol is provided. At block 320, an isocyanate is added to the polyol to form a polyisocyanurate core having an isocyanate index less than 250. A fire retardant may be added the polyisocyanurate core. At block 330, a facer material is coupled with at least one surface of the polyisocyanurate core. The facer material includes a glass fiber mat, or other mat, that may be selected based on the end application of the polyisocyanurate foam board as described herein. In some embodiments, an additional facer material may be coupled with an opposite surface of the polyisocyanurate core.

The resulting polyisocyanurate core may have an R-value measured at 40° F. of greater than 6.5 R/in, such as greater than or about 6.6 R/in, such as greater than or about 6.7 R/in, such as greater than or about 6.8 R/in, such as greater than or about 6.9 R/in, such as greater than or about 7 R/in, or any ranges or values therebetween.

Moreover, the resulting polyisocyanurate core may exhibit an R-value measured at 25° F. of greater than 6.2 R/in, such as greater than or about 6.3 R/in, such as greater than or about 6.4 R/in, such as greater than or about 6.5 R/in, such as greater than or about 6.6 R/in, such as greater than or about 6.65 R/in, or any ranges or values therebetween.

The resulting polyisocyanurate core may exhibit a flame development index (ASTM E84) of less than 35, such as less than or about 34, such as less than or about 33, such as less than or about 32, such as less than or about 31, such as less than or about 30, or any ranges or values therebetween. Additionally or alternatively, in embodiments, the resulting polyisocyanurate core may exhibit a smoke development index (ASTM E84) of less than 450, such as less than or about 425, such as less than or about 400, such as less than or about 375, such as less than or about 350, such as less than or about 325, such as less than or about 300, such as less than or about 290, such as less than or about 285, such as less than or about 280, such as less than or about 275, such as less than or about 270, such as less than or about 265, such as less than or about 260, such as less than or about 255, such as less than or about 250, or any ranges or values therebetween.

Example Foam Formulations

A control sample is show in Table 1, and an example formulation prepared in accordance with embodiments of the present technology is shown in Table 2 below.

TABLE 1

| 290 Index Control (Control 1) | | |
|---|---|---|
| Ingredient | Parts | Foam Wt % |
| B-Side Formulation | | |
| Stepan PS 2352 | 100 | 27.4 |
| TCPP | 15 | 4.1 |
| B 84506 (surfactant) | 1.25 | 0.3 |
| OMG 977 (k-oct) | 7.2 | 2.0 |
| OMG 1123 (K-Ace) | 1.0 | 0.3 |
| Polycat 5 | 0.35 | 0.1 |
| Water | 0.40 | 0.1 |
| Pentane 50/50 i/n | 24.33 | 6.8 |
| Total "B" | 149.53 | 41.0 |
| A-Side Formulation | | |
| Yantai Wannate PM-700 | 214.79 | 59.0 |
| Total "A" | 214.79 | 59.0 |
| Total A + B | 364.32 | 100 |
| Index | 290 | |

TABLE 2

| 260 Index Control (Control 2) | | |
|---|---|---|
| Ingredient | Parts | Foam Wt % |
| Stepan PS 2352 | 100 | 23.5 |
| TEA | 10 | 2.35 |
| TCPP | 15 | 3.53 |
| B 84506 (surfactant) | 1.3 | 0.31 |
| OMG 977 (k-oct) | 6.8 | 1.6 |
| OMG 1123 (K-Ace) | 1.2 | 0.28 |
| Polycat 5 | 0.7 | 0.14 |
| Water | 0.4 | 0.09 |
| Pentane 50/50 i/n | 26.2 | 6.16 |
| Total "B" | 161.5 | 37.98 |
| A-Side Formulation | | |
| Yantai Wannate PM- | 263.69 | 62.01 |
| Total "A" | 263.69 | 62.01 |
| Total A + B | 425.19 | 100 |
| Index | 260 | |

TABLE 3

| 230 Index Control (Control 3) | | |
|---|---|---|
| Ingredient | Parts | Foam Wt. % |
| B-Side Formulation | | |
| Stepan PS 2352 | 100 | 32.86 |
| TCPP | 13.6 | 4.47 |
| B 84506 (surfactant) | 1.15 | 0.38 |
| OMG 977 (k-oct) | 6.1 | 2 |
| OMG 1123 (K-Ace) | 0.9 | 0.3 |
| Polycat 5 | 0.35 | 0.12 |
| Water | 0.35 | 0.12 |
| Pentane 50/50 i/n | 20 | 6.57 |
| Total "B" | 142.45 | 46.81 |
| A-Side Formulation | | |
| Yantai Wannate PM-700 | 161.84 | 53.18 |
| Total "A" | 161.84 | 53.18 |
| Total A + B | 304.29 | 100 |
| Index | 230 | |

TABLE 4

| Example 1: 230 Index | | |
|---|---|---|
| Ingredient | Parts | Foam Wt % |
| B-Side Formulation | | |
| Stepan PS 2352 | 100 | 18.1 |
| TEA | 30 | 5.4 |
| TCPP | 15 | 2.7 |
| B 84506 (surfactant) | 1.6 | 0.3 |
| OMG 977 (k-oct) | 7.8 | 1.4 |
| OMG 1123 (K-Ace) | 1.6 | 0.3 |
| Polycat 5 | 0.8 | 0.1 |
| Water | 0.40 | 0.07 |
| Pentane 50/50 i/n | 30.5 | 5.5 |
| Total "B" | 187.65 | 34.0 |
| A-Side Formulation | | |
| Yantai Wannate PM-700 | 364.31 | 66.0 |
| Total "A" | 364.31 | 66.0 |
| Total A + B | 551.96 | 100 |
| Index | 230 | |

TABLE 5

| Example 2: 260 Index | | |
|---|---|---|
| Ingredient | Parts | Foam Wt. % |
| Stepan PS 2352 | 100 | 19.5 |
| TEA | 20 | 3.9 |
| TCPP | 15 | 2.92 |
| B 84506 (surfactant) | 1.6 | 0.31 |
| OMG 977 (k-oct) | 7.2 | 1.4 |
| OMG 1123 (K-Ace) | 1.5 | 0.29 |
| Polycat 5 | 0.7 | 0.14 |
| Water | 0.4 | 0.08 |
| Pentane 50/50 i/n | 28.4 | 5.54 |
| Total "B" | 174.8 | 34.08 |
| A-Side Formulation | | |
| Yantai Wannate PM- | 338.1 | 65.92 |
| Total "A" | 338.1 | 65.92 |
| Total A + B | 513 | 100 |
| Index | 260 | |

Figure 4:
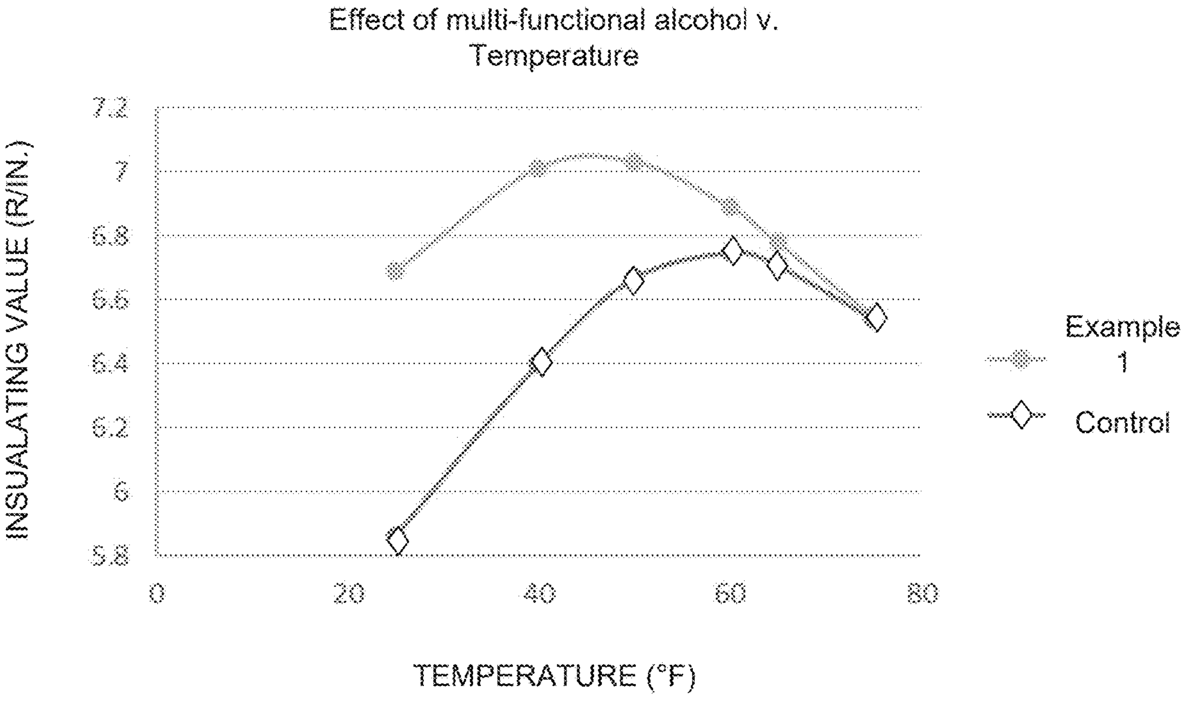
FIG. 4 shows the thermal performance of a board in accordance with embodiments of the invention, as compared with a prior art formulation.

As shown above. Control 2 and Example 2 were both formed with an index of 260. However, Control 2 only contains 10 parts of TEA. The thermal performance of boards made from the control formulation and Example 1 formulation are shown in FIG. 4, and Tables 6 and 7. As is apparent, the insulating value of Examples 1 and 2 is significantly improved over the performance of the prior art control samples at all temperatures in the tested range, but especially at lower temperatures. In addition, the peak R-value is surprisingly shifted from about 60° F. to about 40° F. Furthermore, it was surprising that the fire properties of the boards were equal or significantly improved, even at significantly decreased fire retardant loading values. For instance, as illustrated, both TEA levels and index were necessary to obtain these results, where previously it was believed that a high index and a high fire retardant loading was necessary to obtain excellent low temperature insulation properties in combination with high fire retardancy.

TABLE 6

| | Control | Control 2 | Control 3 | Example 1 | Example 2 |
|---|---|---|---|---|---|
| Index | 290 | 260 | 230 | 230 | 260 |
| R/in (initial) | 6.68 | 6.8 | 6.71 | 6.74 | 6.74 |
| TCPP (wt. % in foam) | 4.12 | 3.5 | 4.41 | 2.72 | 2.92 |
| ASTM E84-FDI | 35 | 30 | 540 | 30 | 35 |
| ASTM E84-SDI | 291 | 282 | 724 | 246 | 188 |
| Total heat release ($MJ/m^2$) | 6.35 | | 9.6 | 6.4 | 6.85 |
| Total mass loss ($g/m^2$) | 327.35 | | 467.2 | 359 | 371.15 |
| PHHR ($kW/m^2$) | 99.45 | | 145.39 | 80.14 | 92.44 |

TABLE 7

| Example Number | R/in. at 25° F. | R/in. at 40° F. | R/in. at 50° F. | R/in. at 60° F. | R/in. at 65° F. | R/in. at 75° F. |
|---|---|---|---|---|---|---|
| Control 1 | 5.86 | 6.4 | 6.67 | 6.75 | 6.71 | 6.54 |
| Control 2 | 6.42 | 6.91 | 7.01 | 6.94 | 6.86 | 6.64 |
| Example 1 | 6.69 | 7.01 | 7.03 | 6.89 | 6.78 | 6.55 |
| Example 2 | 6.57 | 6.97 | 7.05 | 6.94 | 6.84 | 6.61 |

Two additional examples and a control were made in small scale, utilizing the same formulation as Example 1, but included 40 parts and 62.5 parts of TEA. Table 8 shows the thermal performance of Examples 3 and 4.

TABLE 8

| | Control | Example 3 (40 parts TEA) | Example 4 (62.5 parts TEA) |
|---|---|---|---|
| Index | 260 | 240 | 160 |
| TEA wt. % in foam | 0 | 6.14 | 12.75 |
| R/in (initial 75° F.) | 6.41 | 6.41 | 6.04 |
| TCPP (wt. % in foam) | 4.66 | 2.3 | 1.91 |
| Total heat release ($MJ/m^2$) | 4.9 | 4.8 | 10.7 |
| Total mass loss ($g/m^2$) | 259.95 | 281.5 | 534.1 |
| PHHR ($kW/m^2$) | 100.67 | 93.1 | 148.5 |

Example Wall Systems or Insulated Structures

Wall structures or systems of commercial and residential structures are commonly insulated by filling a wall cavity that is positioned between wall studs (wood or metal). The wall cavity may be filled using a spray foam insulation, batt or roll insulation (e.g., fiberglass, mineral wool, cotton, and the like), loose fill insulation (e.g., fiberglass, cellulose, mineral wool, and the like), or a combination thereof. Thermal bridging from the wall studs can reduce the effectiveness of the cavity insulation. To reduce the effects of thermal bridging, the wall system or structure may include external sheathing insulation (e.g., continuous external sheathing), such as with a foil faced rigid polyisocyanurate foam board, that is coupled with the cavity insulation.

Figure 5:
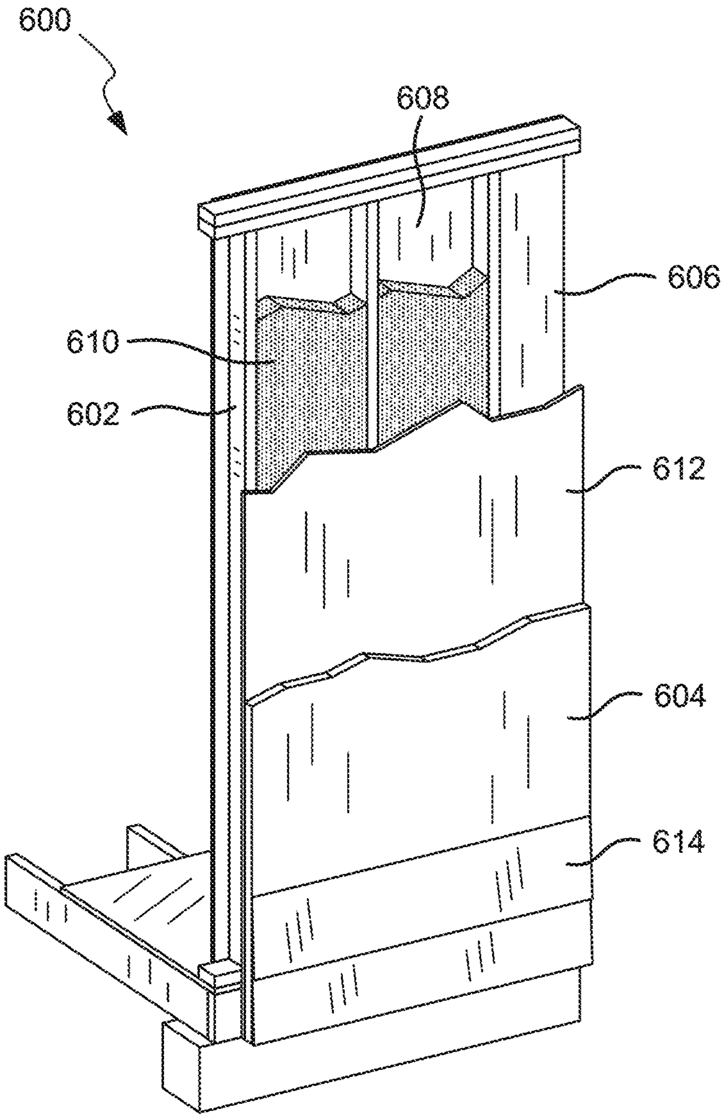
FIG. 5 illustrates a wall system or structure in accordance with embodiments of the invention.

Referring now to FIG. 5, illustrated is an embodiment of a wall system or structure 600 that may be used to insulate a commercial or residential structure. Wall system 600 includes a plurality of structural support members or wall studs 602 that are coupled together to form a wall frame. A plurality of foam boards 604 (hereinafter sheathing boards 604) are attached to an exterior side of the frame to form an insulative exterior wall or surface of the wall system 600 (i.e., continuous external sheathing insulation). A plurality of wall boards 606 are attached to an interior side of the frame opposite the sheathing boards 604 to form an interior wall or surface of the wall system 600. Example wall boards 606 include gypsum boards and the like. The wall studs 602, sheathing boards 604, and wall boards 606 define a plurality of wall cavities 608.

Fasteners (not shown) are used to attach the sheathing boards 604 and wall boards 606 to the respective sides of the frame. Each fastener may include an elongate shaft that penetrates through a respective board and into a wall stud 602 to couple the components together. Example fasteners include nails and screws, although in some embodiments non-mechanical fasteners may be used, such as adhesives and the like. An insulation material 610 is positioned within at least one of the wall cavities 608 of the wall system, and more commonly within each wall cavity 608 or within most of the wall cavities. The insulation material 610 is positioned within the wall cavity 608 to insulate the building or structure. As described herein, example insulation materials include spray foam insulation (open cell and/or close cell), batt or roll insulation (e.g., fiberglass, mineral wool, cotton, and the like), loose fill insulation (e.g., fiberglass, cellulose, mineral wool, and the like), or a combination thereof. The spray foam insulation may be any spray foam insulation described herein.

In some embodiments, an additional wall board 612 may be attached to the exterior side of the frame. In some embodiments, the additional wall board 612 may be free of a halogenated fire retardant, or may include a halogenated fire retardant, where a fire retardant may be present in reduced levels as discussed above, maintaining fire properties at lower foam values. The additional wall board 612 may be a gypsum board, cement board, oriented strand board (OSB), plywood, and the like. Wall board 612 may be positioned between the sheathing board 604 and frame or wall studs 602 for structural support and/or other purposes. External veneer or cladding 614 (hereinafter exterior cladding 614) may be positioned on an exterior side of the sheathing boards 604. In some embodiments, the exterior cladding 614 may be free of a halogenated fire retardant. The exterior cladding 614 may include brick, stucco, rock, siding, paneling, and the like that provides the structure with an aesthetic appeal while optionally also providing one or more desired mechanical or other characteristics. In some embodiments, a drainage cavity or barrier may be positioned between one or more of the components of the wall system, such as between the exterior cladding 614 and the sheathing boards 604. The wall system 600 may also include other components, layers, and/or materials that are not shown, such as an interior vapor barrier, flashing, primer, and the like.

As described herein, the sheathing board 604 of wall system 600 include a polyisocyanurate core that is produced from: an isocyanate, a polyol, and a blowing agent. The polyisocyanurate core has an R-value per inch of at least 6.5 when measured at 40° F. The polyisocyanurate core may be any core described herein.

In some embodiments, the sheathing board 604 may also include a foil facer that is attached to an exterior side of the board. The sheathing boards 604 may have a foam core density of between about 1.5 and 2.5 $lbs/ft^3$, and more commonly between about 1.6 and 2.0 $lbs/ft^3$. In some embodiments, the polyisocyanurate core also include between 1 and 10 weight percent of a hydrocarbon blowing agent. The sheathing board more commonly include between about 5 and 8 weight percent of the hydrocarbon blowing agent. The sheathing board may be any foam board described herein.

Figure 6:
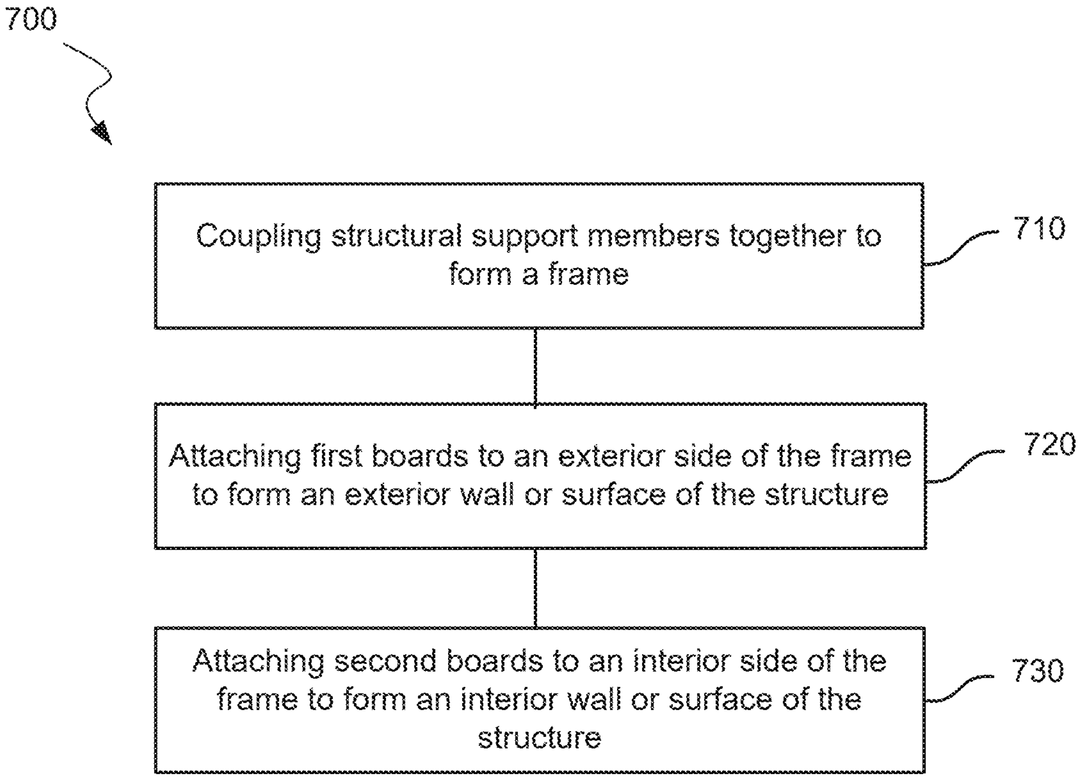
FIG. 6 illustrates a method of forming a wall of a structure in accordance with embodiments of the invention.

Referring now to FIG. 6, illustrated is a method 700 of forming a wall of a structure. At block 710, a plurality of structural support members (i.e., wall studs) are coupled together to form a frame. At block 720, a plurality of first boards (i.e., foam boards or polyisocyanurate sheathing boards) are attached to an exterior side of the frame to form an insulative exterior wall or surface. At block 730, a plurality of second boards (i.e., wall boards) are attached to an interior side of the frame to form an interior wall or surface. The structural support members, foam boards, and wall boards are coupled together to define a plurality of wall cavities. An insulation material (e.g., a spray foam material, a fiberglass material, or a combination thereof) may be positioned within at least one of the wall cavities, and commonly most or all wall cavities, to insulate an interior space of the structure.

As described herein, at least one of the foam boards includes a polyisocyanurate core that is produced from an isocyanate, a polyol, and a blowing agent.

In some embodiments, the method also includes applying between 1 and 10 weight percent of a hydrocarbon blowing agent to the polyisocyanurate core. In some embodiments, the method further includes attaching a foil facer to an exterior side of the polyisocyanurate core. Preferably, the polyisocyanurate core has an R-value per inch of at least 6.5 when measured at 40° F.

Wall systems may include those described in U.S. application Ser. No. 14/299,571, now U.S. Pat. No. 9,523,195, which is incorporated herein by reference for all purposes.

Example Roofing Systems

Commercial and industrial roofing system usually include a combination of layers, such as an insulation layer and a waterproof layer. In some instances, a cover board can be used between the insulation layer and waterproof layer to add fire and/or mechanical protection, such as hail resistance. According to the embodiments herein, a roofing system's insulation layer for commercial and/or industrial roofing includes polyisocyanurate foam boards. The waterproof layer includes a built-up roof, modified bitumen, and/or a single ply membrane, such as thermoplastic olefin (TPO), polyvinyl chloride (PVC), ethylene propylene diene monomer (EPDM), metal, and the like.

Figure 7:
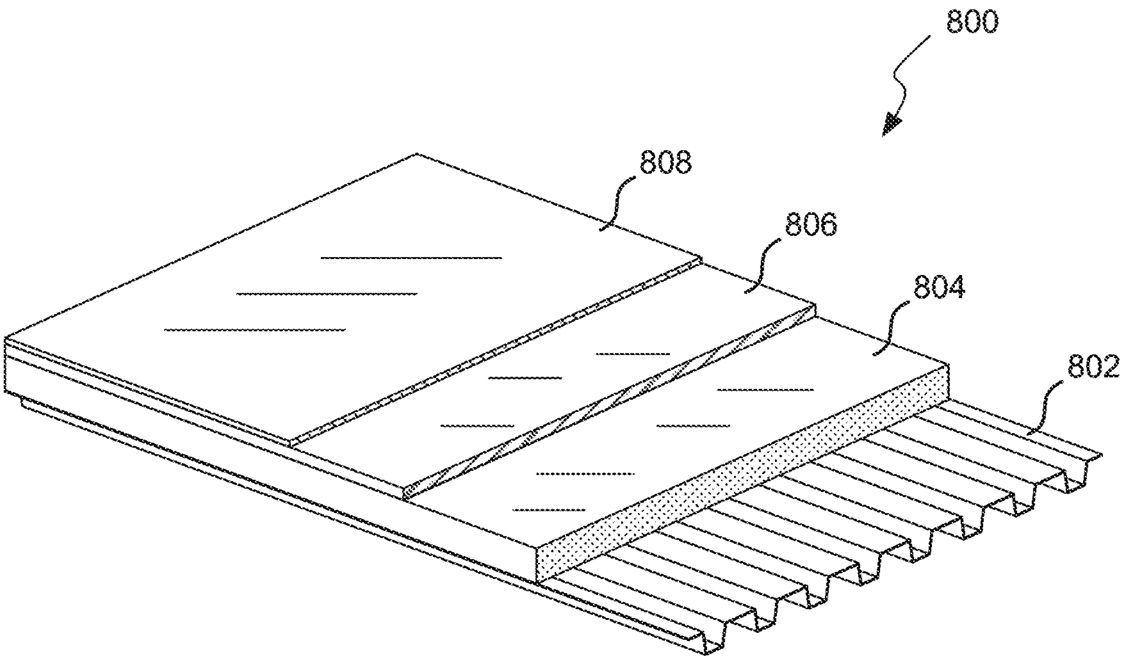
FIG. 7 shows a construction of a commercial roof deck in accordance with embodiments of the invention.

Referring now to FIG. 7, a construction of a commercial roof deck (i.e., roof system 800) is shown. Roof system 800 includes a structural deck 802, which is commonly made of steel or galvanized metal (18 to 22 gauge), although other types of materials and/or sizes are possible. The structural deck 802 is commonly positioned above steel, metal, or other joists and supported thereby. A plurality of foam insulation boards 804 (hereinafter insulation boards 804) are positioned atop the structural deck 802 to form an insulative layer of roofing system 800. As described herein, the insulation boards 804 are preferably polyisocyanurate foam boards having R-value per inch of at least 6.5 when measured at 40° F. The foam board may be any foam board described herein.

In some embodiments, a plurality of cover boards 806 are positioned atop the insulation boards 804 to add a protective layer to roofing system 800. The cover boards 806 may be added for fire and/or mechanical protection (e.g., hail or impact resistance) or for various other reasons. In embodiments, the cover boards 806 may include perlite based boards, gypsum based boards, and the like. In some embodiments, the roofing system 800 does not include cover boards 806. In some embodiments, the cover boards may be boards embodying the present technology.

A waterproof membrane 808 is positioned atop the roofing system 800. The waterproof membrane 808 may be positioned atop the cover boards 806, insulation boards 804, and/or another component/layer of the roofing system 800. In some embodiments, the waterproof membrane 808 may include a built-up roof, modified bitumen, thermoplastic olefin (TPO), ethylene propylene diene monomer (EPDM), metal, and the like. The waterproof membrane 808 may be ballasted, adhered, mechanically fastened, and the like atop the roofing system 800 to couple the waterproof membrane 808 with the roofing system's components/layers. Further, individual components of the waterproof membrane 808 may be coupled together to form the waterproof membrane 808. For example, individual TPO segments, sheets, or strips may be heat welded together to form a substantially continuous TPO layer atop the roofing system 800. Similarly, individual EPDM segments may be adhered or bonded together and metal segments may be mechanically fastened or bonded to form a substantially continuous waterproof membrane layer.

The roofing system 800 may be slightly sloped to promote drainage of water and/or for various other reasons as desired. The roof system 800 may also include other components, layers, and/or materials that are not shown, such as bonding cement, primer, acoustic infills, and the like.

As described herein, the insulation boards 804 and/or cover boards 806 are polyisocyanurate foam boards that include a polyisocyanurate core. The polyisocyanurate core is produced from an isocyanate, a polyol, and a blowing agent. The polyisocyanurate core may be any core described herein.

In some embodiments, each of the insulation boards 804 also includes a facer that is coupled with one or more surfaces of the insulation board 804, commonly both surfaces. The facer typically includes a glass fiber mat, but may include other types of facer materials. The facer may include: a reinforced cellulosic felt facer, an un-coated polymer bonded glass fiber mat, a coated polymer bonded glass fiber mat, and the like. The facer may be coated or uncoated as desired to provide a desired characteristic, such as fire retardancy, mechanical strength, and the like. The insulation board 804 may have a foam density of between about 1.5 and 2.0 $lbs/ft^3$, and more commonly between about 1.6 and 1.7 $lbs/ft^3$. In some embodiments, the insulation board's polyisocyanurate core also includes between 1 and 10 weight percent of a hydrocarbon blowing agent. The insulation boards 804 commonly include between about 5 and 8 weight percent of the hydrocarbon blowing agent.

In some embodiments, each of the cover boards 806 also includes a facer that is coupled with one or more surfaces of the cover board 806, commonly both surfaces. The facer typically includes a glass fiber mat, but may include other types of facer materials. The cover board 806 may have a foam density of between about 3 and 8 $lbs/ft^3$, and more commonly between about 6 and 7 $lbs/ft^3$. In some embodiments, the cover board's polyisocyanurate core also includes between 1 and 10 weight percent of a hydrocarbon blowing agent, which may be a highly flammable material as described herein above. The cover boards 806 commonly include between about 1.5 and 3 weight percent of the hydrocarbon blowing agent.

Figure 8:
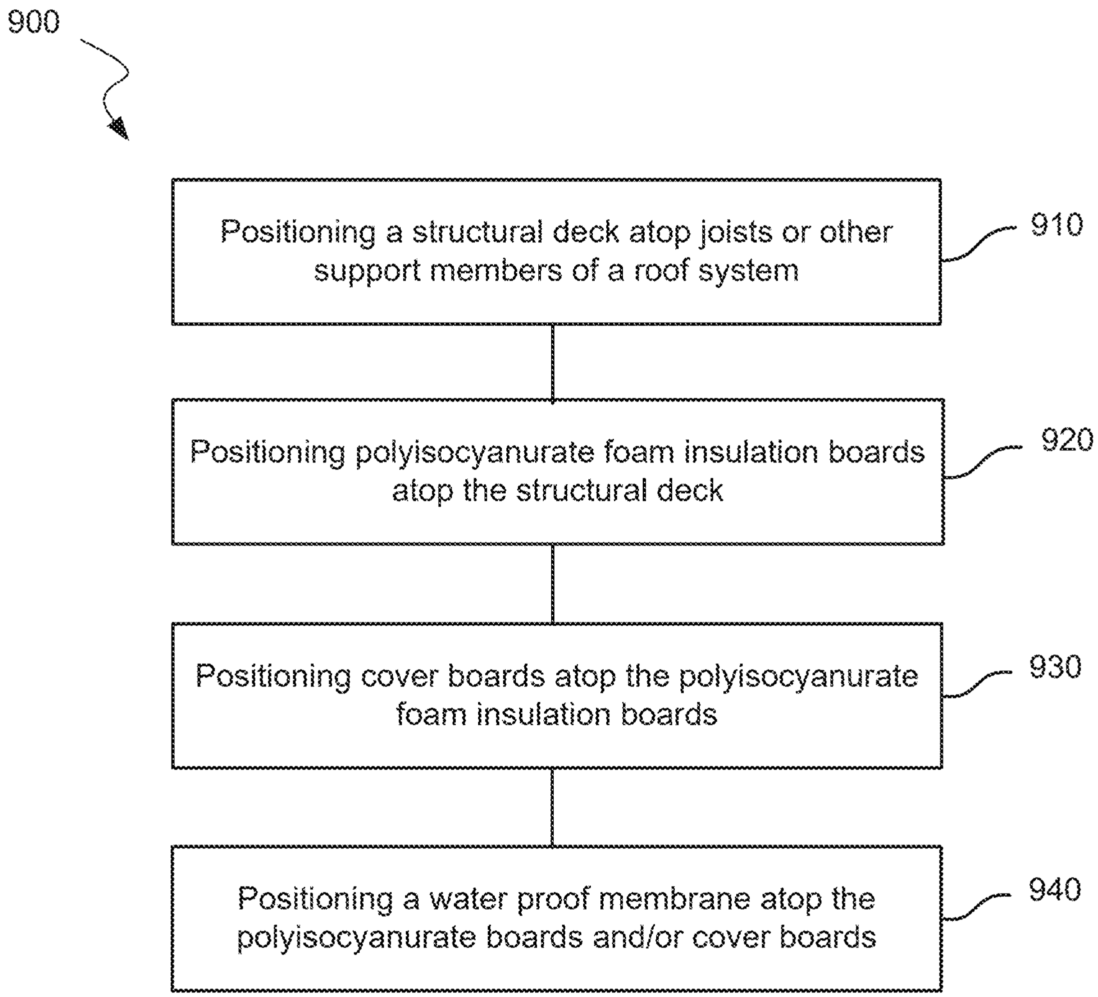
FIG. 8 illustrates a method of forming a roofing system in accordance with embodiments of the invention.

Referring now to FIG. 8, illustrated is a method 900 of forming a roofing system of a structure. At block 910, a structural deck is assembled atop joists (metal and the like) or other structurally supporting members. At block 920, a plurality of foam insulation boards (i.e., polyisocyanurate foam roof insulation boards) are positioned atop the structural deck to provide an insulation layer for the roofing system. At block 930, a plurality of cover boards are optionally positioned atop the foam insulation boards to form a protective layer for the roofing system. At block 940, a waterproof membrane is positioned atop the foam insulation boards and/or cover boards to provide a waterproof layer for the roofing system.

As described herein, at least one of the foam insulation boards includes a polyisocyanurate core that is produced from an isocyanate, a polyol, and a blowing agent. The polyisocyanurate core may be any polyisocyanurate core described herein, and preferably has an R-value per inch of at least 5.7 when measured at 40° F.

In some embodiments, at least one of the cover boards includes a polyisocyanurate core that is produced from an isocyanate, a polyol, and a blowing agent. In some embodiments, the method includes applying between 1 and 10 weight percent of the blowing agent to the polyisocyanurate core of the foam insulation board(s) and/or cover board(s). In some embodiments, the method further includes attaching a facer to at least one surface of the foam insulation board(s) and/or cover board(s).

Roofing systems may include those described in U.S. application Ser. No. 14/299,631, now U.S. Pat. No. 9,528,269, which is incorporated herein by reference for all purposes.

All patents, patent publications, patent applications, journal articles, books, technical references, and the like discussed in the instant disclosure are incorporated herein by reference in their entirety for all purposes.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms “a”, “an”, and “the” include plural referents unless the context clearly dictates otherwise. Thus, for example, reference to “a process” includes a plurality of such processes and reference to “the device” includes reference to one or more devices and equivalents thereof known to those skilled in the art, and so forth.

Also, the words “comprise,” “comprising,” “include,” “including,” and “includes” when used in this specification and in the following claims are intended to specify the presence of stated features, integers, components, or steps, but they do not preclude the presence or addition of one or more other features, integers, components, steps, acts, or groups.

What is claimed is:

1. A polyisocyanurate foam insulation product, comprising:
- a polyisocyanurate core comprising
  - a blowing agent,
  - a polyol component comprising one or more polyester polyols,
  - at least one multi-functional alcohol, wherein the at least one multi-functional alcohol is present in an amount of greater than 22.5 parts per 100 parts of the one or more polyester polyols,
  - an isocyanate component, and
  - a fire retardant,
  - wherein the fire retardant is present in an amount of less than or about 3.5 wt. %, based upon a weight of the polyisocyanurate core, and the polyisocyanurate foam insulation product exhibits a smoke development index (ASTM E84) of less than 450.

2. The polyisocyanurate foam insulation product of claim 1, wherein the polyisocyanurate core comprises a ratio of NCO groups to OH groups of less than 2.5:1.

3. The polyisocyanurate foam insulation product of claim 1, wherein the polyisocyanurate core comprises an isocyanate index of less than 260, wherein the isocyanate index is measured as:

$$\text{Index} = \frac{\text{Moles of NCO group}}{\text{Moles of OH group}} \times 100.$$

4. The polyisocyanurate foam insulation product of claim 1, further comprising a facer coupled with a first surface of the polyisocyanurate core, wherein the facer comprises fiberglass, felt, foil, or paper.

5. The polyisocyanurate foam insulation product of claim 1, wherein the polyisocyanurate foam insulation product has an R-value per inch of at least 6.2 when measured at 25° F.

6. The polyisocyanurate foam insulation product of claim 1, wherein the one or more polyester polyols has a hydroxyl number between about 25 and 500.

7. The polyisocyanurate foam insulation product of claim 1, wherein the multi-functional alcohol includes triethanolamine (TEA), and wherein the triethanolamine is present in the polyisocyanurate core in an amount of about 1 wt. % to about 10 wt. %, based on the weight of the polyisocyanurate core.

8. A roofing or wall system, comprising:
- a polyisocyanurate foam insulation product having a polyisocyanurate core, the polyisocyanurate core comprising
  - a blowing agent,
  - a polyol component comprising one or more polyester polyols,
  - at least one multi-functional alcohol, wherein the at least one multi-functional alcohol is present in an amount of greater than 20 parts per 100 parts of the one or more polyester polyols,
  - an isocyanate component, and
  - a fire retardant,
- wherein the fire retardant is present in an amount of less than or about 3.5 wt. %, based upon a weight of the polyisocyanurate core, the polyisocyanurate core comprises an isocyanate index of less than or about 240, and the polyisocyanurate foam insulation product exhibits a smoke development index (ASTM E84) of less than 450.

9. The system of claim 8, wherein the polyisocyanurate foam insulation product comprises a polyisocyanurate foam board.

10. The system of claim 9, wherein the polyisocyanurate foam board comprises a wall board.

11. The system of claim 9, wherein the polyisocyanurate foam board comprises an insulation board, a cover board, or a combination thereof.

12. The system of claim 8, wherein the polyisocyanurate foam insulation product has an R-value per inch of at least 6.2 when measured at 25° F.

13. The system of claim 8, further comprising a facer coupled with a first surface of the polyisocyanurate core, wherein the facer comprises fiberglass, felt, foil, or paper.

* * * * *